(12) United States Patent
Boss et al.

(10) Patent No.: US 9,738,136 B2
(45) Date of Patent: Aug. 22, 2017

(54) SYSTEM AND METHOD TO ADJUST VEHICLE TEMPERATURE BASED ON DRIVER LOCATION

(71) Applicant: GLOBALFOUNDRIES INC., Grand Cayman (KY)

(72) Inventors: Gregory J. Boss, Saginaw, MI (US); Andrew R. Jones, Round Rock, TX (US); Charles S. Lingafelt, Durham, NC (US); Kevin C. McConnell, Austin, TX (US); John E. Moore, Jr., Brownsburg, IN (US)

(73) Assignee: GLOBALFOUNDRIES INC., Grand Cayman (KY)

( * ) Notice: Subject to any disclaimer, the term of this patent is extended or adjusted under 35 U.S.C. 154(b) by 827 days.

(21) Appl. No.: 14/079,784

(22) Filed: Nov. 14, 2013

(65) Prior Publication Data

US 2015/0129192 A1    May 14, 2015

(51) Int. Cl.
*B60H 1/00* (2006.01)

(52) U.S. Cl.
CPC ..... *B60H 1/00771* (2013.01); *B60H 1/00878* (2013.01); *B60H 2001/00992* (2013.01)

(58) Field of Classification Search
CPC ............ B60H 1/00771; B60H 1/00878; B60H 1/00778; B60H 1/00742; B60H 1/00821; B60H 1/00892; B60H 2001/00992; B60H 1/3245
USPC ........................................................ 165/202
See application file for complete search history.

(56) References Cited

U.S. PATENT DOCUMENTS

| 3,577,164 | A | 5/1971 | Re Baratelli et al. |
| 6,357,244 | B1 * | 3/2002 | Mori ...................... G08G 1/202 165/202 |
| 6,745,582 | B1 | 6/2004 | Urbank et al. |
| 7,441,414 | B2 | 10/2008 | Ziehr et al. |
| 7,650,864 | B2 | 1/2010 | Hassan et al. |

(Continued)

FOREIGN PATENT DOCUMENTS

CN    1586938    3/2005

OTHER PUBLICATIONS

China Electronics Shenzhen Company, Carvox, http://www.carvox.net/product_display.aspx?id=450, p. 1, Aug. 27, 2013.

*Primary Examiner* — Travis Ruby
(74) *Attorney, Agent, or Firm* — Gibb & Riley, LLC

(57) ABSTRACT

A vehicle climate control system. An air conditioner and heater are operatively connected to a controller and control the temperature of the cabin area of a vehicle. A processor, operatively connected to the controller, determines the amount of time for an operator of the vehicle to travel between their location and the location of the vehicle. The processor determines an amount of time required to adjust the temperature of the cabin area of the vehicle to a selected temperature by using one of the air conditioner and the heater. The processor automatically operates one of the air conditioner and the heater to begin adjusting the temperature of the cabin area to the selected temperature when the amount of time required for the operator to travel between their location and the location of the vehicle is less than or equal to the amount of time required to adjust the temperature of the cabin area vehicle to the selected temperature.

20 Claims, 9 Drawing Sheets

(56) References Cited

U.S. PATENT DOCUMENTS

| | | |
|---|---|---|
| 7,775,453 B2 | 8/2010 | Hara |
| 8,096,482 B2 | 1/2012 | Dage |
| 8,174,381 B2 | 5/2012 | Imes et al. |
| 8,849,487 B2 * | 9/2014 | Malone ................ B60H 1/004 |
| | | 165/202 |
| 2004/0111199 A1 | 6/2004 | Javaherian |
| 2009/0025412 A1 | 1/2009 | Takehisa |
| 2010/0094482 A1 | 4/2010 | Schofield et al. |
| 2010/0235046 A1 | 9/2010 | Proefke et al. |
| 2011/0166734 A1 | 7/2011 | Ferguson et al. |
| 2012/0267442 A1 * | 10/2012 | Choi ................ G05D 23/1902 |
| | | 236/51 |

* cited by examiner

SYSTEM AND METHOD TO ADJUST VEHICLE TEMPERATURE BASED ON DRIVER LOCATION

BACKGROUND

The present disclosure relates to a vehicle climate control system, and more specifically, to systems and methods for automatically controlling a temperature of the cabin of the vehicle.

When a vehicle is left in the elements (heat or cold), it can be uncomfortable to enter the vehicle until it cools or has time to warm. Remote starters on vehicles are often used to start the vehicle in order to get the cooling/heating started for when the passenger arrives. For example, consider an operator who attends a movie or football game. The operator knows, based on their location and season, that when they return to their vehicle it will be very hot inside. Using current technology, once in sight of the vehicle, the operator begins pushing a button, in order to remote start the vehicle so that it can start cooling down. The air conditioner turns on and begins to cool, but due to how close proximity the operator has to be to the vehicle, the temperature only drops a few degrees. A similar scenario applies for cold in winter.

SUMMARY

Disclosed herein is a system and method to have a vehicle's interior at the desired temperature (hotter or cooler than it presently is) before the operator arrives based on how long it takes to cool/heat the vehicle according to historical cooling/heating times and the distance/time it takes for the operator to get to the vehicle.

According to systems and methods herein, the operator's distance from the vehicle and the operator's actions are monitored, in addition to measuring inside/outside temperatures of the vehicle. Using historical data or pre-loaded data from the manufacturer, it is known that it takes a certain amount of time for the vehicle to change temperature by 1 degree. This system then monitors where the operator is, using a smart phone application via GPS or remote starter key fob manual activation, and determines what the average walking distance to the vehicle is. The vehicle calculates the time before the operator arrives and then operates the climate control system to adjust the vehicle to the desired temp, just as the operator arrives. That is, the method adjusts the temperature of the vehicle to the right temperature (hotter or cooler) before the operator enters the vehicle, without having to wait.

According to a method of controlling temperature inside a vehicle herein, the location of an operator of a vehicle is automatically monitored. The distance between the location of the operator and the location of the vehicle is automatically determined. The amount of time required for the operator to travel the distance is automatically determined. The internal temperature of the vehicle is automatically determined. The amount of time required to adjust the internal temperature of the vehicle to a selected temperature based on climate control features of the vehicle is automatically determined. The climate control features are automatically controlled to begin adjusting the internal temperature of the vehicle to the selected temperature when the amount of time required for the operator to travel the distance is less than or equal to the amount of time required to adjust the internal temperature of the vehicle to the selected temperature.

According to a system herein, the system includes a temperature sensor, a location sensor, a climate control system, and a processor. The temperature sensor generates a temperature signal indicating an internal cabin temperature of a vehicle. The climate control system controls the internal cabin temperature of the vehicle. The location sensor generates a location signal indicating a location of an operator of the vehicle. The processor automatically determines an amount of time required for the operator to travel the distance between the location of the operator and a location of the vehicle. The processor automatically determines an amount of time required to adjust the internal cabin temperature of the vehicle to a selected temperature using the climate control system, based on the internal cabin temperature. The processor automatically operates the climate control system to begin adjusting the internal cabin temperature of the vehicle to the selected temperature when the amount of time required for the operator to travel the distance is less than or equal to the amount of time required to adjust the internal cabin temperature of the vehicle to the selected temperature.

According to a vehicle climate control system herein, a temperature sensor determines a temperature of a cabin area of a vehicle. A controller is operatively connected to the temperature sensor. An air conditioner and heater are operatively connected to the controller and control the temperature of the cabin area of the vehicle. A processor is operatively connected to the controller. The processor determines an amount of time required for an operator of the vehicle to travel between a location of the operator and a location of the vehicle. The processor determines an amount of time required to adjust the temperature of the cabin area of the vehicle to a selected temperature by selectively using one of the air conditioner and the heater. The processor automatically selectively operates one of the air conditioner and the heater to begin adjusting the temperature of the cabin area of the vehicle to the selected temperature when the amount of time required for the operator to travel between the location of the operator and the location of the vehicle is less than or equal to the amount of time required to adjust the temperature of the cabin area of the vehicle to the selected temperature.

BRIEF DESCRIPTION OF THE DRAWINGS

The systems and methods herein will be better understood from the following detailed description with reference to the drawings, which are not necessarily drawn to scale, and in which.

DETAILED DESCRIPTION

Figure 1:
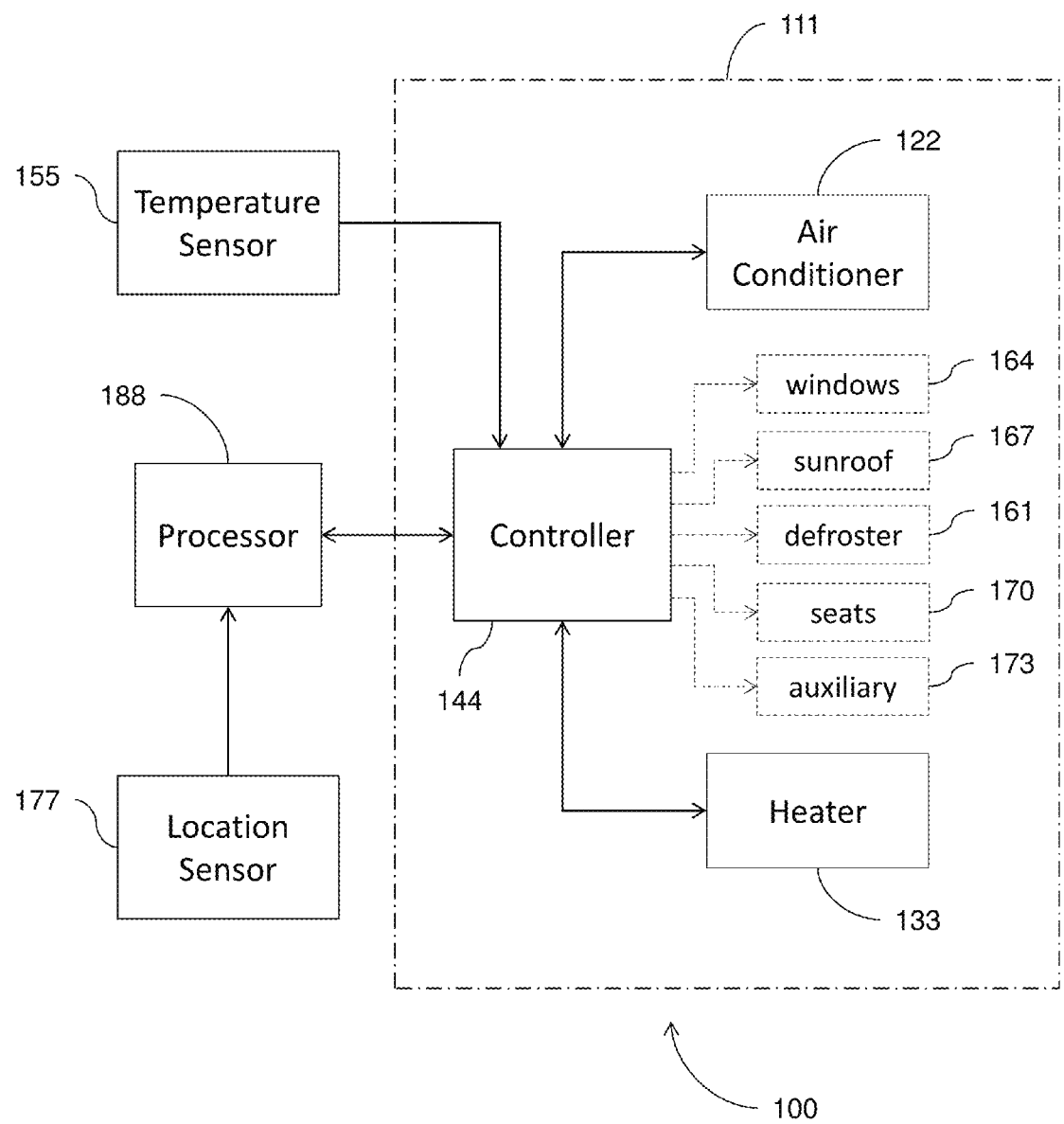
FIG. 1 is a schematic block diagram illustrating various aspects of systems and methods herein.

It will be readily understood that the systems and methods of the present disclosure, as generally described and illustrated in the drawings herein, may be arranged and designed in a wide variety of different configurations in addition to the systems and methods described herein. Thus, the following detailed description of the systems and methods, as represented in the drawings, is not intended to limit the scope defined by the appended claims, but is merely representative of selected systems and methods. The following description is intended only by way of example, and simply illustrates certain concepts of the systems and methods, as disclosed and claimed herein.

The advantage of this invention is the ability to provide automobile owners the most desirable operating environment of their vehicle as it relates to the temperature of the vehicle. Additionally, the methods described provide fuel savings over current solutions. This invention also provides user-friendly features for either automobile manufactures or after market vendors that will better sell their products.

Referring now to the drawings, and more particularly to FIG. 1, a system, indicated generally as 100, is configured to provide a custom operation for providing optimal comfort upon occupant entry into the vehicle. The system 100 may perform, and not limited to, engine idle control (e.g., increase/decrease) as needed for comfort/fuel economy, heated and cooled seat operation control as needed, front and rear defrost control, climate system control such as blower speed, mode, recirculation, temperature settings regardless of last known programmed setting, and load shedding control based on battery state of charge. Such system 100 may optimize fuel economy and provide optimal comfort for the occupant prior to occupant entry into the vehicle in the event a remote start operation is invoked.

According to systems and methods herein, the system 100 includes a climate control system 111 comprising an air conditioner 122 and a heater 133 operatively connected to a temperature controller 144. As is known in the relevant art, the air conditioner 122 may include a compressor that pressurizes and compresses a refrigerant in a refrigeration cycle, a compressor driver driving the compressor, a heat exchanger, piping and the like. According to systems and methods herein, it is contemplated that the compressor driver may be an electric motor or other device operatively connected to the engine of the vehicle.

The heater 133 includes a heat exchanger for a heating source that can be used for heating the cabin of the vehicle by using heat typically derived from the cooling-water of an internal combustion engine of the vehicle. According to systems and methods herein, the heater 133 may comprise electrical resistive heating elements and the like.

The climate control system 111 includes a fan that supplies a temperature-controlled wind into the vehicle. According to systems and methods herein, a variable speed motor may drive the fan. Additionally, the climate control system 111 may include an indoor-outdoor air changeover device that changes over from indoor air to outdoor air and that introduces the outdoor air into the cabin of the vehicle. As is known in the art, the climate control system 111 may include a blowing-port selecting device that selectively supplies the temperature-controlled wind to one of a defroster blowing port, a ventilator blowing port, and a foot blowing port.

The air conditioner 122 and heater 133 are operatively coupled to the temperature controller 144. The temperature controller 144 is generally configured to the control the operation of the climate control system 111 (e.g., heating/cooling of the interior of the vehicle). The controller 144 is configured to selectively control the air-conditioner 122 and heater 133 based on a temperature output of the temperature sensor 155 and a temperature value set by an operator or passenger of the vehicle.

The climate control system 111 generally defines a heating, ventilation, and air conditioning (HVAC) system of the vehicle. The controller 144 may be implemented as a part of an instrument panel of the vehicle. The controller 144 may include a plurality of input switches for user selection to select climate control options. Such options may include, and not limited to, setting desired temperatures for a given zone(s) in the vehicle, selecting between panel, floor, and front window and/or rear window defroster 161, selecting blend modes between heated and cooled air, recirculation of cabin air, and selecting blower speeds for distributing air throughout the cabin of the vehicle. Additionally, the controller 144 may operate windows 164 and/or a sunroof 167 in order to assist in adjusting the internal temperature of the vehicle. For example, the controller 144 may augment cooling of the vehicle by automatically rolling down windows 164 and/or opening a sunroof 167 to increase outside airflow in order to achieve a faster and cheaper cooling target temperature.

Climate control seats 170 may optionally be coupled to the controller 144. Such climate control seats 170 may be heated and/or cooled seats. In one example, the climate control seats 170 may include a heated seat module or climate control seat module that is responsive to the controller 144. One or more switches may be coupled to the controller 144 to allow occupants to control the operation of the heated and/or cooled seats. In such a case, the controller 144 may transmit control signals to control the heated seat and cooled seat operation. In another example, switches may be directly coupled to the heated and/or cooled seats to allow occupants to heat or cool seats accordingly. The controller 144 may also be coupled to auxiliary devices or other functions 173, such as a heated steering wheel (not shown) for controlling heated steering operation and other operations, as described below.

The location sensor 177 generates a location signal indicating a location of an operator of the vehicle. The location sensor 177 may comprise a smartphone, key fob, GPS device, personal computer, and the like that can determine the location of the operator and transmit that location to a processor 188. According to systems and methods herein, the location sensor 177 may transmit the location of the operator wirelessly and can transmit and receive signals through the Internet.

According to systems and methods herein, the operator may indicate a preference for the cabin temperature of the vehicle using either a smart phone application or as a part of an instrument panel within the vehicle onboard system itself. The operator can set a target temperature with options to set different temperatures based on specific time or date, e.g., the season, the day of week, the time of day. Furthermore, the operator may set a limit on costs, for example so the vehicle doesn't expend too much gas in adjusting the temperature.

Figure 2:
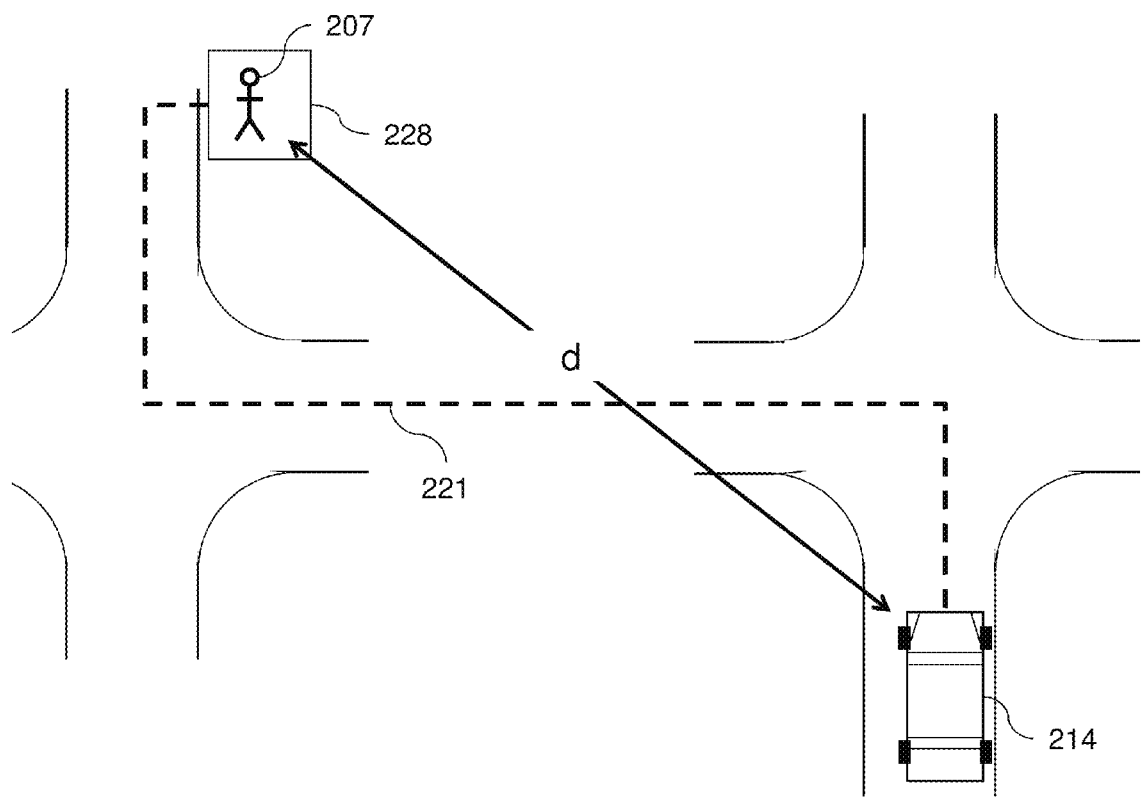
FIG. 2 is a block diagram of a map illustrating various aspects of systems and methods herein.

Referring to FIG. 2, an operator 207 may be some distance 'd' away from the vehicle 214. The processor 188 (FIG. 1) determines a path (indicated by the broken line 221) that the operator 207 may travel to get from his/her present location 228 to the vehicle 214. The processor 188 automatically determines the amount of time required for the operator 207 to travel the path 221 between the location 228 of the operator 207 and the location of the vehicle 214. The processor 188 accounts for the speed of the operator 207 and obstacles, such as stairs, buildings, etc. in determining the amount of time required for the operator 207 to travel the path 221 between the location 228 of the operator 207 and the location of the vehicle 214.

The temperature sensor 155 may comprise an in-car temperature sensor operatively coupled to controller 144 for providing internal cabin temperature (or in-car temperature) of the vehicle. Based on the in-car temperature, the processor 188 automatically determines an amount of time required to adjust the internal cabin temperature of the vehicle to the selected temperature using the climate control system 111. The processor 188 automatically operates the climate control system 111 to begin adjusting the in-car temperature to the selected temperature when the amount of time required for the operator to travel from the operator's location 228 to the vehicle 214 is less than or equal to the amount of time required to adjust the in-car temperature to the selected temperature.

According to systems and methods herein, the processor 188 can trigger the heater 133 or air conditioner 122 to achieve target temperature just-in-time for the operator 207 to arrive at the vehicle 214. The trigger time can be adjusted based on the preferences of the operator 207 for conserving energy. Auxiliary devices or other functions 173 may also include safety preferences, such as whether the operator 207 desires windows to be rolled down or not. This preference could be based on location. For example, if the vehicle 214 is at home, allow it; if the vehicle 214 is parked away from home, do not allow it. Other preferences may include minimum energy level to operate the climate control system in vehicle 214. For example, an electric vehicle may operate the heater 133 only when it is plugged-in.

Figure 3:
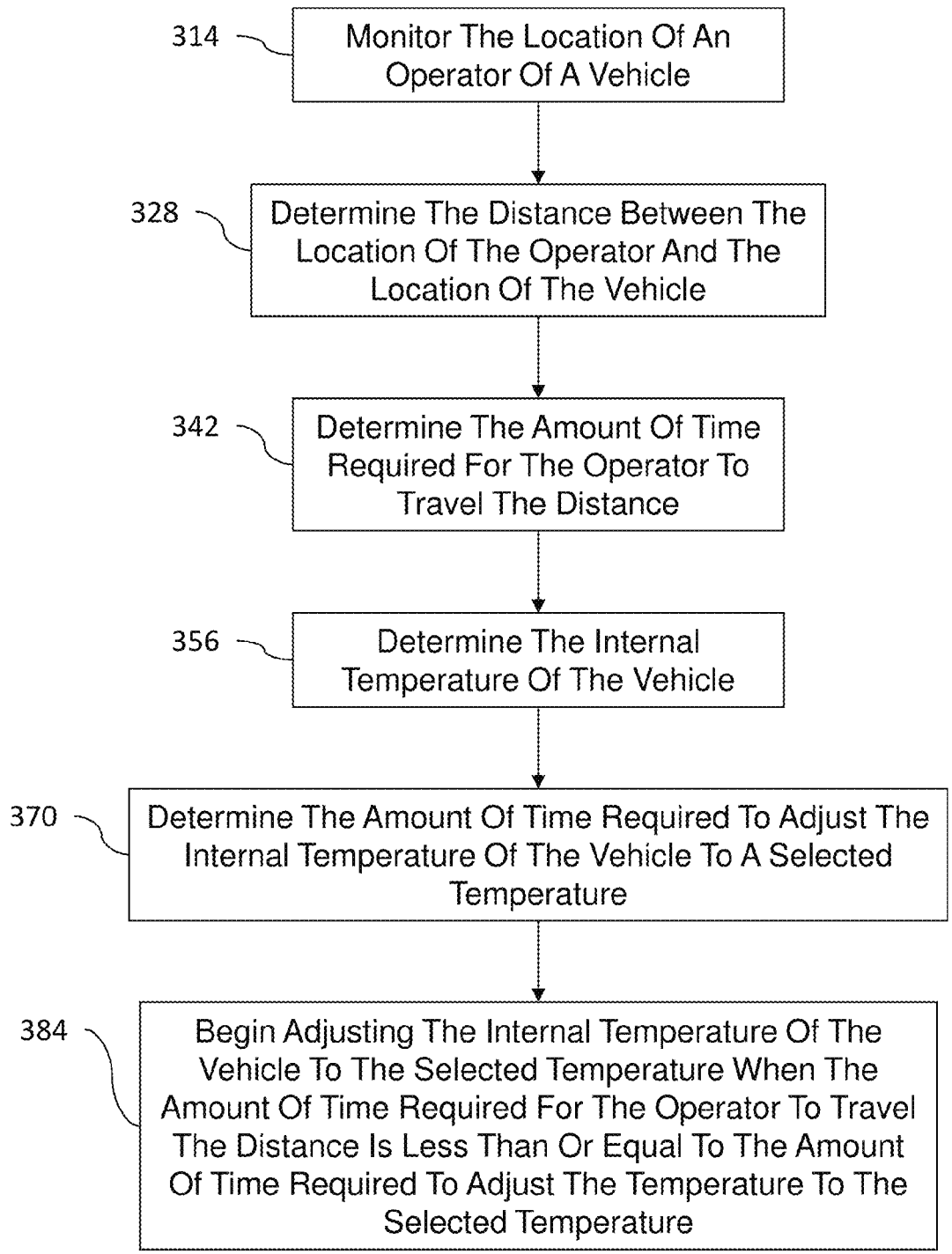
FIG. 3 is a flow diagram illustrating systems and methods herein.

FIG. 3 is a flow diagram illustrating the processing flow of an exemplary method of controlling temperature inside a vehicle according to systems and methods herein. At 314, the location of an operator of a vehicle is monitored. The distance between the location of the operator and the location of the vehicle is determined, at 328. The amount of time required for the operator to travel the distance to the vehicle is automatically determined, at 342. At 356, the internal temperature of the vehicle is automatically determined. The amount of time required to adjust the internal temperature of the vehicle to a selected temperature based on the climate control features of the vehicle is automatically determined, at 370. At 384, the climate control features are automatically controlled to begin adjusting the internal temperature of the vehicle to the selected temperature when the amount of time required for the operator to travel the distance is less than or equal to the amount of time required to adjust the internal temperature of the vehicle to the selected temperature.

In other words, the system 100 determines the time to achieve a target temperature by assessing outside air temperature and humidity, assessing inside cabin air temperature and humidity, assessing outside wind speed, and assessing historical/programmed data on changes in temperature over time. The location sensor 177 triggers a signal to the vehicle 214 that the operator 207 will be entering the vehicle in the near term by monitoring the distance of the operator 207 from the vehicle 214; monitoring the actions of the operator 207, such as checking out at a store; monitoring the calendar of the operator 207, for example, a meeting time ending in 5 minutes; associating historical time-to-return in similar situations, such as trips to a grocery store, returning from daily work location, etc.; and monitoring a manual indication from the operator 207 through pressing a remote key fob button, etc. According to systems and methods herein, the time to achieve a target temperature may be calculated/monitored continuously until one of the triggers is met. When the estimated time for vehicle 214 to achieve the desired temperature is less than or equal to the estimated time for the operator 207 to return, then the system 100 begins temperature adjustments. In some cases, this may also cause the engine to start.

If the energy storage level is or becomes less than a minimum energy level, then operation of the vehicle may be stopped. (Note: that the energy level may be based on any number of energy sources, e.g., hydrocarbon fuel storage level, electrical storage fuel level, hydrogen fuel storage level, compressed air fuel storage level, etc.)

It is contemplated that other features may be included in the system 100. For example, the system 100 may be integrated with garage door openers to allow for adequate airflow in order to prevent carbon monoxide build up. Additionally, the system 100 may be integrated with weather prediction and monitoring systems in order to override user defined event of rolling down windows if the chance of rain is above a specific threshold.

Aspects of the present disclosure are described herein with reference to flowchart illustrations and/or block diagrams of methods, apparatus (systems), and computer program products according to various systems and methods. It will be understood that each block of the flowchart illustrations and/or two-dimensional block diagrams, and combinations of blocks in the flowchart illustrations and/or block diagrams, can be implemented by computer program instructions. The computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The computer program instructions may be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

Furthermore, the computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

In case of implementing the devices and methods herein by software and/or firmware, a program constituting the software may be installed into a computer with dedicated hardware, from a storage medium or a network, and the computer is capable of performing various functions if with various programs installed therein.

According to a further system and method herein, an article of manufacture is provided that includes a computer readable medium having computer readable instructions embodied therein for performing the steps of the computer implemented methods, including but not limited to the methods illustrated in FIG. 3. Any combination of one or more computer readable non-transitory medium(s) may be utilized. The computer readable medium may be a computer readable signal medium or a computer readable storage medium. The non-transitory computer storage medium stores instructions, and a processor executes the instructions to perform the methods described herein. A computer readable storage medium may be, for example, but not limited to, an electronic, magnetic, optical, electromagnetic, infrared, or semiconductor system, apparatus, or device, or any suitable combination of the foregoing.

Figure 4:
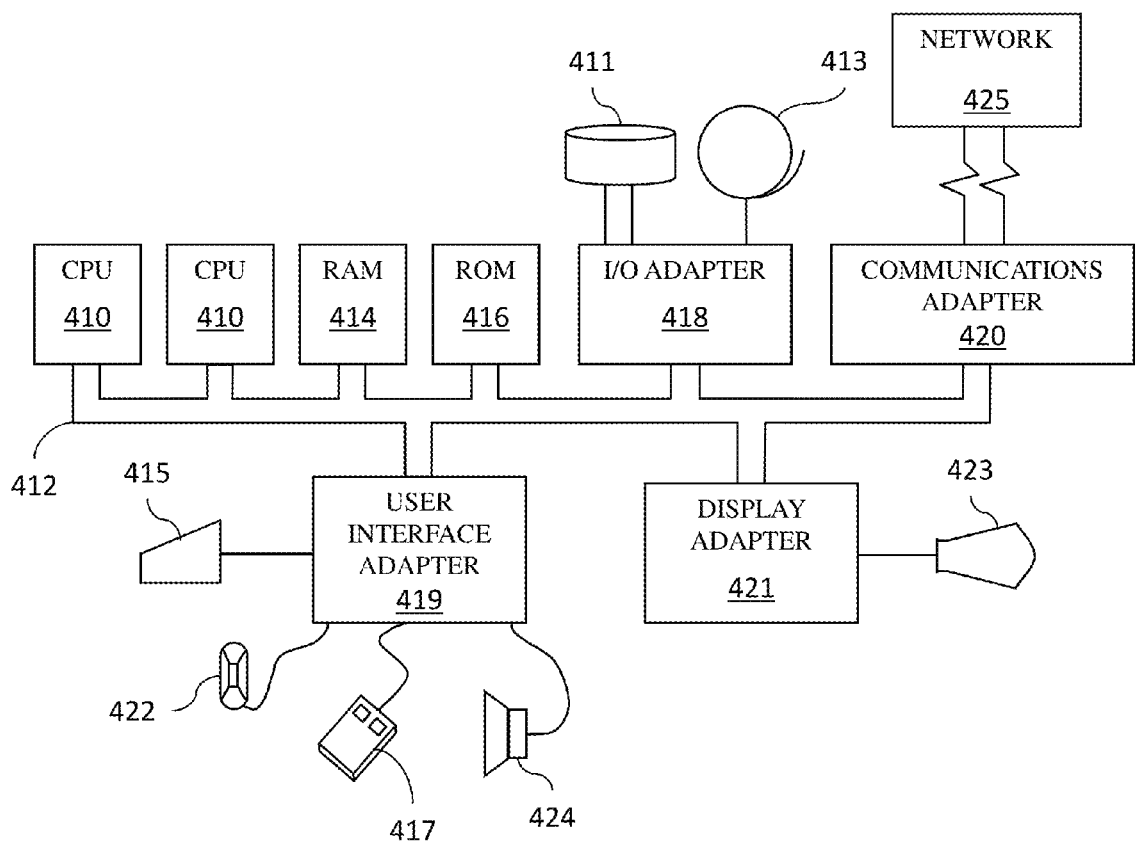
FIG. 4 is a schematic diagram of a hardware system according to systems and methods herein.

A representative hardware environment for practicing the systems and methods herein is depicted in FIG. 4. This schematic drawing illustrates a hardware configuration of an information handling/computer system in accordance with the systems and methods herein. The system comprises at least one processor or central processing unit (CPU) 410. The CPUs 410 are interconnected via system bus 412 to various devices such as a Random Access Memory (RAM) 414, Read-Only Memory (ROM) 416, and an Input/Output (I/O) adapter 418. The I/O adapter 418 can connect to peripheral devices, such as disk units 411 and tape drives 413, or other program storage devices that are readable by the system. The system can read the inventive instructions on the program storage devices and follow these instructions to execute the methodology of the systems and methods herein.

In FIG. 4, CPUs 410 perform various processing based on a program stored in a Read-Only Memory (ROM) 416 or a program loaded from a peripheral device, such as disk units 411 and tape drives 413 to a Random Access Memory (RAM) 414. In the RAM 414, required data when the CPUs 410 perform the various processing or the like is also stored as necessary. The CPUs 410, the ROM 416, and the RAM 414 are connected to one another via a bus 412. An I/O adapter 418 is also connected to the bus 412 to provide an input/output interface, as necessary. A removable medium, such as a magnetic disk, an optical disk, a magneto-optical disk, a semiconductor memory, or the like, is installed on the peripheral device, as necessary, so that a computer program read therefrom may be installed into the RAM 414, as necessary.

The system further includes a user interface adapter 419 that connects a keyboard 415, mouse 417, speaker 424, microphone 422, and/or other user interface devices such as a touch screen device (not shown) to the bus 412 to gather user input. Additionally, a communication adapter 420 including a network interface card such as a LAN card, a modem, or the like connects the bus 412 to a data processing network 425. The communication adapter 420 performs communication processing via a network such as the Internet. A display adapter 421 connects the bus 412 to a display device 423, which may be embodied as an output device such as a monitor (such as a Cathode Ray Tube (CRT), a Liquid Crystal Display (LCD), or the like), printer, or transmitter, for example.

In the case where the above-described series of processing is implemented with software, the program that constitutes the software may be installed from a network such as the Internet or a storage medium such as the removable medium.

Those skilled in the art would appreciate that the storage medium is not limited to the peripheral device having the program stored therein as illustrated in FIG. 4, which is distributed separately from the device for providing the program to the user. Examples of a removable medium include a magnetic disk (including a floppy disk), an optical disk (including a Compact Disk-Read Only Memory (CD-ROM) and a Digital Versatile Disk (DVD)), a magneto-optical disk (including a Mini-Disk (MD) (registered trademark)), and a semiconductor memory. Alternatively, the storage medium may be the ROM 416, a hard disk contained in the storage section of the disk units 411, or the like, which has the program stored therein and is distributed to the user together with the device that contains them.

As will be appreciated by one skilled in the art, aspects of the systems and methods herein may be embodied as a system, method, or computer program product. Accordingly, aspects of the present disclosure may take the form of an entirely hardware system, an entirely software system (including firmware, resident software, micro-code, etc.) or a system combining software and hardware aspects that may all generally be referred to herein as a "circuit," "module", or "system." Furthermore, aspects of the present disclosure may take the form of a computer program product embodied in one or more computer readable medium(s) having computer readable program code embodied thereon.

Any combination of one or more computer readable non-transitory medium(s) may be utilized. The computer readable medium may be a computer readable signal medium or a computer readable storage medium. The non-transitory computer storage medium stores instructions, and a processor executes the instructions to perform the methods described herein. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium include the following: an electrical connection having one or more wires, a portable computer diskette, a hard disk, a Random Access Memory (RAM), a Read-Only Memory (ROM), an Erasable Programmable Read-Only Memory (EPROM or Flash memory), an optical fiber, a magnetic storage device, a portable compact disc Read-Only Memory (CD-ROM), an optical storage device, a "plug-and-play" memory device, like a USB flash drive, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including, but not limited to, wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++, or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The flowchart and block diagrams in the figures illustrate the architecture, functionality, and operation of possible implementations of systems, methods, and computer program products according to various systems and methods herein. In this regard, each block in the flowchart or block diagrams may represent a module, segment, or portion of code, which comprises one or more executable instructions for implementing the specified logical function(s). It should also be noted that, in some alternative implementations, the functions noted in the block might occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Deployment types include loading directly in the client, server, and proxy computers via loading a storage medium such as a CD, DVD, etc. The process software may also be automatically or semi-automatically deployed into a computer system by sending the process software to a central server or a group of central servers. The process software is then downloaded into the client computers that will execute the process software. The process software is sent directly to the client system via e-mail. The process software is then either detached to a directory or loaded into a directory by a button on the e-mail that executes a program that detaches the process software into a directory. Alternatively, the process software is sent directly to a directory on the client computer hard drive. When there are proxy servers, the process will select the proxy server code, determine on which computers to place the proxy servers' code, transmit the proxy server code, and then install the proxy server code on the proxy computer. The process software will be transmitted to the proxy server, and then stored on the proxy server.

While it is understood that the process software may be deployed by manually loading directly in the client, server, and proxy computers via loading a storage medium such as a CD, DVD, etc., the process software may also be automatically or semi-automatically deployed into a computer system by sending the process software to a central server or a group of central servers. The process software is then downloaded into the client computers that will execute the process software. Alternatively, the process software is sent directly to the client system via e-mail. The process software is then either detached to a directory or loaded into a directory by a button on the e-mail that executes a program that detaches the process software into a directory. Another alternative is to send the process software directly to a directory on the client computer hard drive. When there are proxy servers, the process will select the proxy server code, determine on which computers to place the proxy servers' code, transmit the proxy server code, and then install the proxy server code on the proxy computer. The process software will be transmitted to the proxy server, and then stored on the proxy server.

Figure 5:
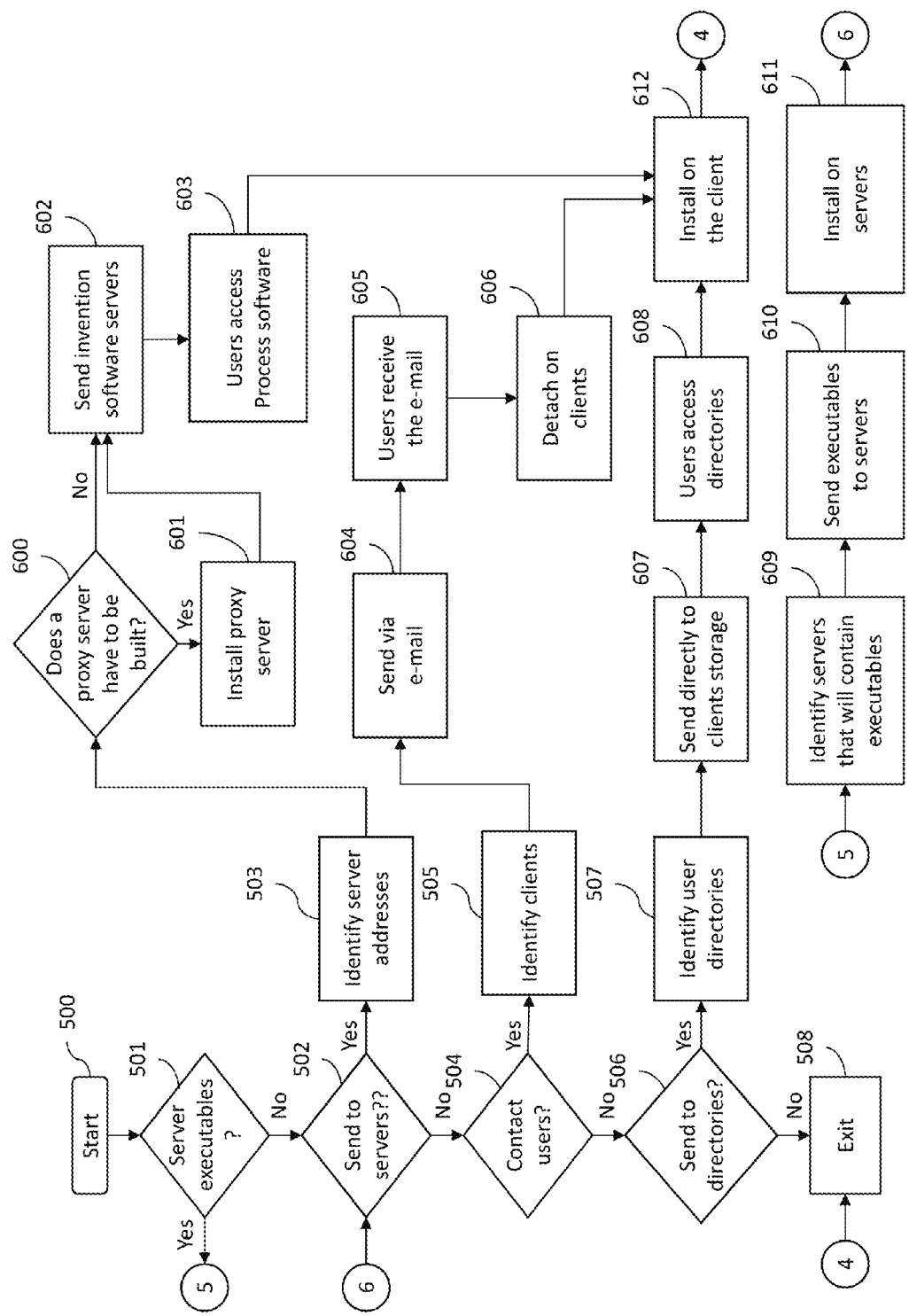
FIG. 5 is a schematic diagram of a deployment system according to systems and methods herein.

In FIG. 5, step 500 begins the deployment of the process software. The first thing is to determine if there are any programs that will reside on a server or servers when the process software is executed 501. If this is the case, then the servers that will contain the executables are identified 609. The process software for the server or servers is transferred directly to the servers' storage via FTP or some other protocol or by copying through the use of a shared file system 610. The process software is then installed on the servers 611.

Next, a determination is made on whether the process software is to be deployed by having users access the process software on a server or servers 502. If the users are to access the process software on servers, then the server addresses that will store the process software are identified 503.

A determination is made if a proxy server is to be built 600 to store the process software. A proxy server is a server that sits between a client application, such as a Web browser, and a real server. It intercepts all requests to the real server to see if it can fulfill the requests itself. If not, it forwards the request to the real server. The two primary benefits of a proxy server are to improve performance and to filter requests. If a proxy server is required, then the proxy server is installed 601. The process software is either sent to the servers via a protocol such as FTP or it is copied directly from the source files to the server files via file sharing 602. Another method would be to send a transaction to the servers that contain the process software and have the server process the transaction, then receive and copy the process software to the server's file system. Once the process software is stored at the servers, the users, via their client computers, then access the process software on the servers and copy it to their client computers' file systems 603. Another method is to have the servers automatically copy the process software to each client and then run the installation program for the process software at each client computer. The users execute the program that installs the process software on their client computer 612, and then exit the process 508.

In step 504, a determination is made whether the process software is to be deployed by sending the process software to users via e-mail. The set of users where the process software will be deployed are identified together with the addresses of the user client computers 505. The process software is sent via e-mail 604 to each of the users' client computers. The users receive the e-mail 605 and then detach the process software from the e-mail to a directory on their client computers 606. The users execute the program that installs the process software on their client computer 612, and then exit the process 508.

Lastly, a determination is made on whether the process software will be sent directly to user directories on their client computers 506. If so, the user directories are identified 507. The process software is transferred directly to the users' client computer directory 607. This can be done in several ways such as, but not limited to, sharing of the file system directories and then copying from the sender's file system to the recipient users' file system or alternatively using a transfer protocol such as File Transfer Protocol (FTP). The users access the directories on their client file systems in preparation for installing the process software 608. The users execute the program that installs the process software on their client computer 612, and then exit the process 508.

The process software is integrated into a client, server, and network environment by providing for the process software to coexist with applications, operating systems, and network operating systems software, and then installing the process software on the clients and servers in the environment where the process software will function.

The first step is to identify any software on the clients and servers including the network operating system where the process software will be deployed that are required by the process software or that work in conjunction with the process software. This includes the network operating system that is software that enhances a basic operating system by adding networking features.

Next, the software applications and version numbers will be identified and compared to the list of software applications and version numbers that have been tested to work with the process software. Those software applications that are missing or that do not match the correct version will be upgraded with the correct version numbers. Program instructions that pass parameters from the process software to the software applications will be checked to ensure the parameter lists match the parameter lists required by the process software. Conversely, parameters passed by the software applications to the process software will be checked to ensure the parameters match the parameters required by the process software. The client and server operating systems including the network operating systems will be identified and compared to the list of operating systems, version numbers, and network software that have been tested to work with the process software. Those operating systems, version numbers, and network software that do not match the list of tested operating systems and version numbers will be upgraded on the clients and servers to the required level.

After ensuring that the software, where the process software is to be deployed, is at the correct version level that has been tested to work with the process software, the integration is completed by installing the process software on the clients and servers.

Figure 6:
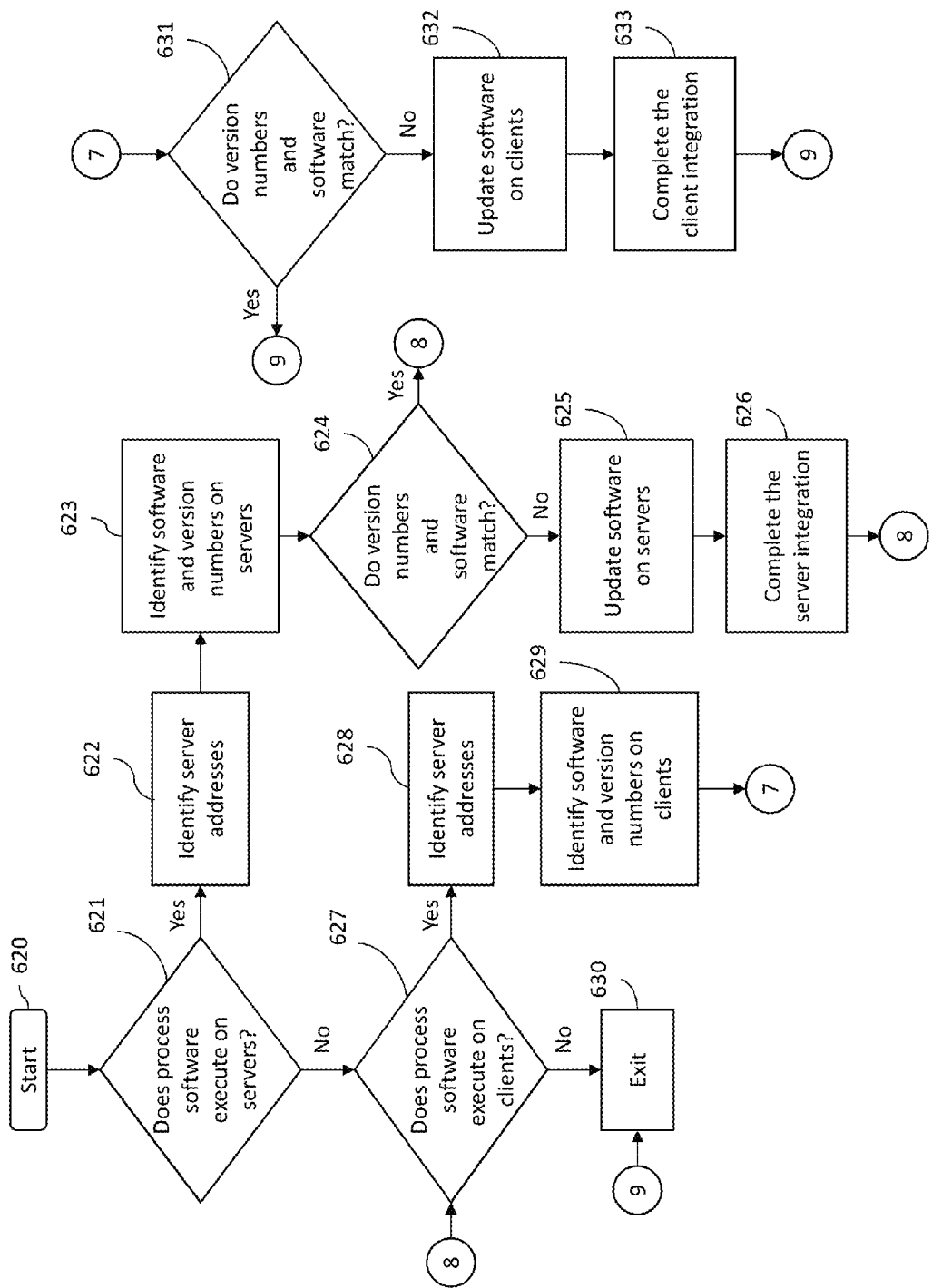
FIG. 6 is a schematic diagram of an integration system according to systems and methods herein.

In FIG. 6, step 620 begins the integration of the process software. The first thing is to determine if there are any process software programs that will execute on a server or servers 621. If this is not the case, then integration proceeds to 627. If this is the case, then the server addresses are identified 622. The servers are checked to see if they contain software that includes the operating system (OS), applications, and network operating systems (NOS), together with their version numbers, that have been tested with the process software 623. The servers are also checked to determine if there is any missing software that is required by the process software 623.

A determination is made if the version numbers match the version numbers of OS, applications, and NOS that have been tested with the process software 624. If all of the versions match and there is no missing required software, the integration continues in 627.

If one or more of the version numbers do not match, then the unmatched versions are updated on the server or servers with the correct versions 625. Additionally, if there is missing required software, then it is updated on the server or servers 625. The server integration is completed by installing the process software 626.

Step 627, which follows either step 621, 624, or 626, determines if there are any programs of the process software that will execute on the clients. If no process software programs execute on the clients, the integration proceeds to 630 and exits. If this is not the case, then the client addresses are identified at 628.

The clients are checked to see if they contain software that includes the operating system (OS), applications, and network operating systems (NOS), together with their version numbers, that have been tested with the process software 629. The clients are also checked to determine if there is any missing software that is required by the process software 629.

A determination is made as to whether the version numbers match the version numbers of OS, applications, and NOS that have been tested with the process software 631. If all of the versions match and there is no missing required software then the integration proceeds to 630 and exits.

If one or more of the version numbers do not match, then the unmatched versions are updated on the clients with the correct versions 632. In addition, if there is missing required software then it is updated on the clients 632. The client integration is completed by installing the process software on the clients 633. The integration proceeds to 630 and exits.

The process software is shared, simultaneously serving multiple customers in a flexible, automated fashion. It is standardized, requiring little customization, and it is scalable, providing capacity On-Demand in a pay-as-you-go model.

The process software can be stored on a shared file system accessible from one or more servers. The process software is executed via transactions that contain data and server processing requests that use CPU units on the accessed server. CPU units are units of time such as minutes, seconds, and hours on the central processor of the server. Additionally, the assessed server may make requests of other servers that require CPU units. CPU units are an example that represents one measurement of use. Other measurements of use include, but are not limited to, network bandwidth, memory usage, storage usage, packet transfers, complete transactions etc.

When multiple customers use the same process software application, their transactions are differentiated by the parameters included in the transactions that identify the unique customer and the type of service for that customer. All of the CPU units and other measurements of use that are used for the services for each customer are recorded. When the number of transactions to any one server reaches a number that begins to affect the performance of that server, other servers are accessed to increase the capacity and to share the workload. Likewise, when other measurements of use such as network bandwidth, memory usage, storage usage, etc. approach a capacity so as to affect performance, additional network bandwidth, memory usage, storage etc. are added to share the workload.

The measurements of use that are used for each service and customer are sent to a collecting server that sums the measurements of use for each customer for each service that was processed anywhere in the network of servers that provide the shared execution of the process software. The summed measurements of use units are periodically multiplied by unit costs and the resulting total process software application service costs are alternatively sent to the customer and/or indicated on a web site accessed by the customer, which then remits payment to the service provider.

In another method, the service provider requests payment directly from a customer account at a banking or financial institution.

In another method, if the service provider is also a customer of the customer that uses the process software application, the payment owed to the service provider is reconciled to the payment owed by the service provider to minimize the transfer of payments.

Figure 7:
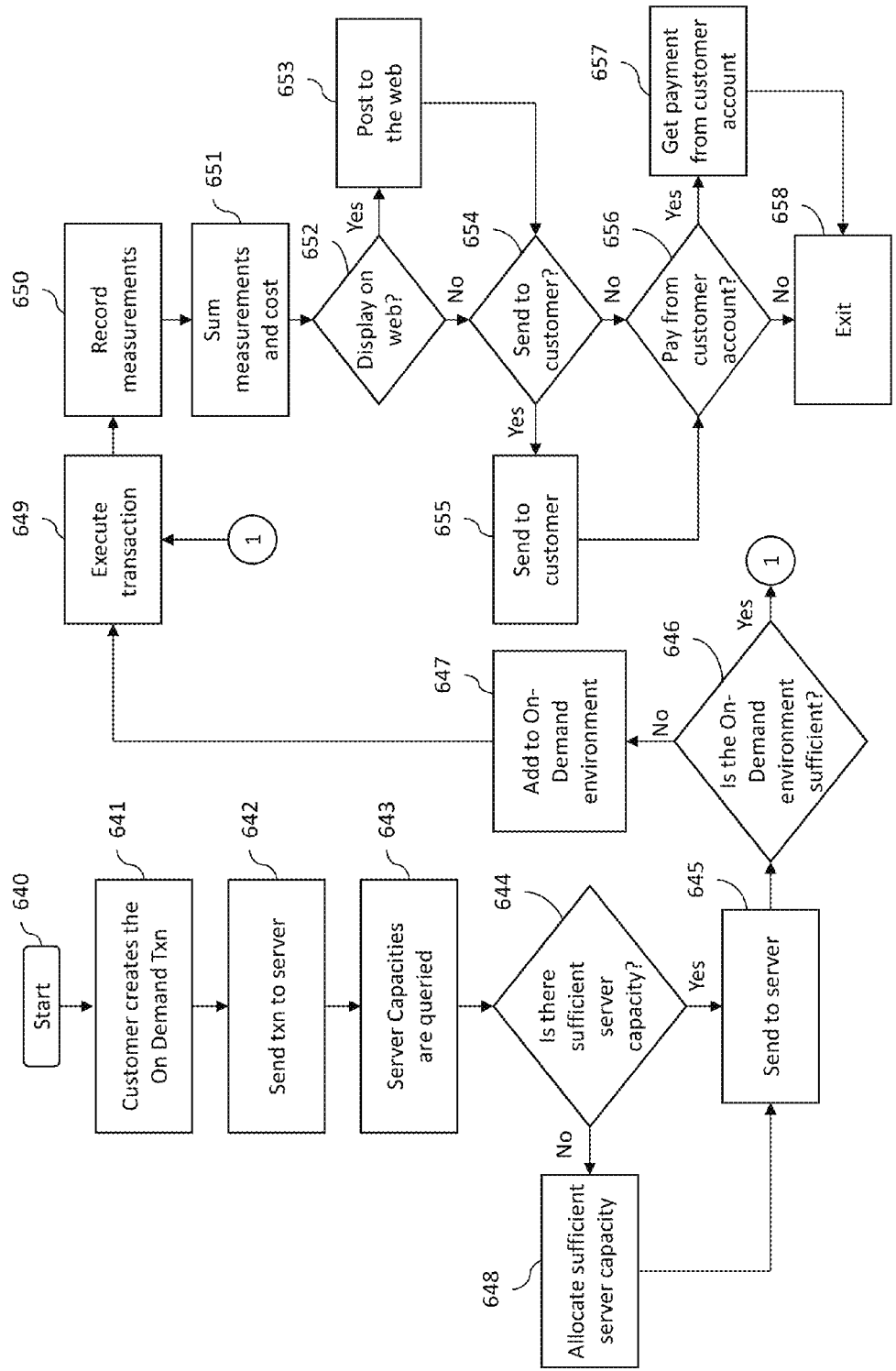
FIG. 7 is a schematic diagram of an On-Demand system according to systems and methods herein.

In FIG. 7, step 640 begins the On-Demand process. A transaction is created that contains the unique customer identification, the requested service type, and any service parameters that further specify the type of service 641. The transaction is then sent to the main server 642. In an On-Demand environment, the main server can initially be the only server, then, as capacity is consumed, other servers are added to the On-Demand environment.

The server central processing unit (CPU) capacities in the On-Demand environment are queried 643. The CPU requirement of the transaction is estimated, and then the servers' available CPU capacity in the On-Demand environment is compared to the transaction CPU requirement to see if there is sufficient CPU capacity available in any server to process the transaction 644. If there is not sufficient server CPU capacity available, then additional server CPU capacity is allocated to process the transaction 648. If there was already sufficient CPU capacity available, then the transaction is sent to a selected server 645.

Before executing the transaction, a check is made of the remaining On-Demand environment to determine if the environment has sufficient available capacity for processing the transaction. This environment capacity consists of such things as, but not limited to, network bandwidth, processor memory, storage etc. 646. If there is not sufficient available capacity, then capacity will be added to the On-Demand environment 647. Next, the required software to process the transaction is accessed, loaded into memory, and then the transaction is executed 649.

The usage measurements are recorded 650. The usage measurements consist of the portions of those functions in the On-Demand environment that are used to process the transaction. The usage of such functions as, but not limited to, network bandwidth, processor memory, storage, and CPU cycles are what are recorded. The usage measurements are summed, multiplied by unit costs, and then recorded as a charge to the requesting customer 651. If the customer has requested that the On-Demand costs be posted to a web site 652, then they are posted 653.

If the customer has requested that the On-Demand costs be sent via e-mail to a customer address 654, then they are sent 655. If the customer has requested that the On-Demand costs be paid directly from a customer account 656, then payment is received directly from the customer account 657. The last step is to exit the On-Demand process 658.

The process software may be deployed, accessed and executed through the use of a virtual private network (VPN), which is any combination of technologies that can be used to secure a connection through an otherwise unsecured or untrusted network. The use of VPNs is to improve security and for reduced operational costs. The VPN makes use of a public network, usually the Internet, to connect remote sites or users together. Instead of using a dedicated, real-world connection such as leased line, the VPN uses "virtual" connections routed through the Internet from the company's private network to the remote site or employee.

The process software may be deployed, accessed, and executed through either a remote-access or a site-to-site VPN. When using the remote-access VPNs, the process software is deployed, accessed, and executed via the secure, encrypted connections between a company's private network and remote users through a third-party service provider. The enterprise service provider (ESP) sets a network access server (NAS) and provides the remote users with desktop client software for their computers. The telecommuters can then dial a toll-free number or attach directly via a cable or DSL modem to reach the NAS and use their VPN client software to access the corporate network and to access, download, and execute the process software.

When using the site-to-site VPN, the process software is deployed, accessed, and executed through the use of dedicated equipment and large-scale encryption, which are used to connect a company's multiple fixed sites over a public network, such as the Internet.

The process software is transported over the VPN via tunneling, which is the process of placing an entire packet within another packet and sending it over a network. The protocol of the outer packet is understood by the network and both points, called tunnel interfaces, where the packet enters and exits the network.

Figure 8:
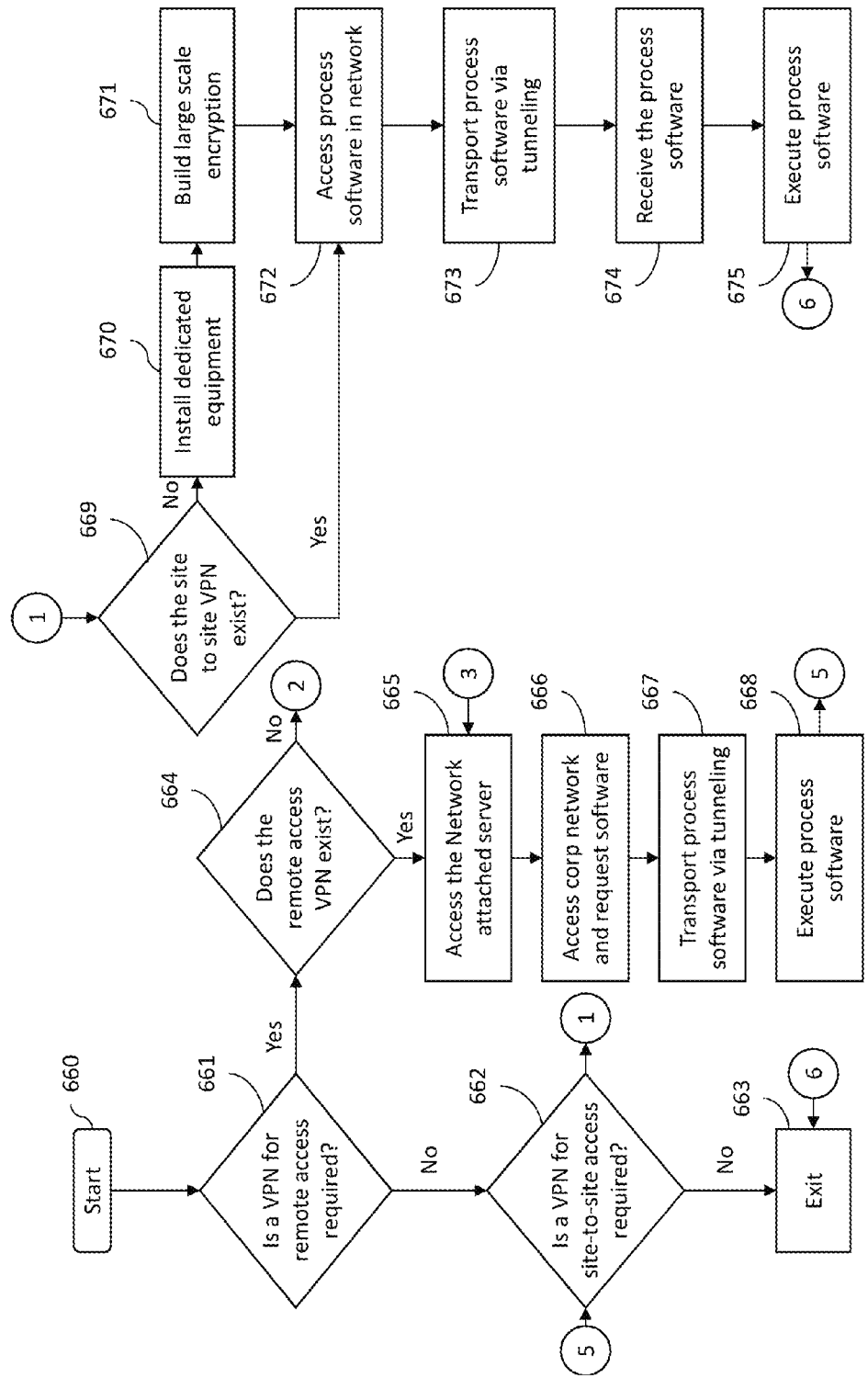
FIG. 8 is a schematic diagram of a virtual private network system according to systems and methods herein.
Figure 9:
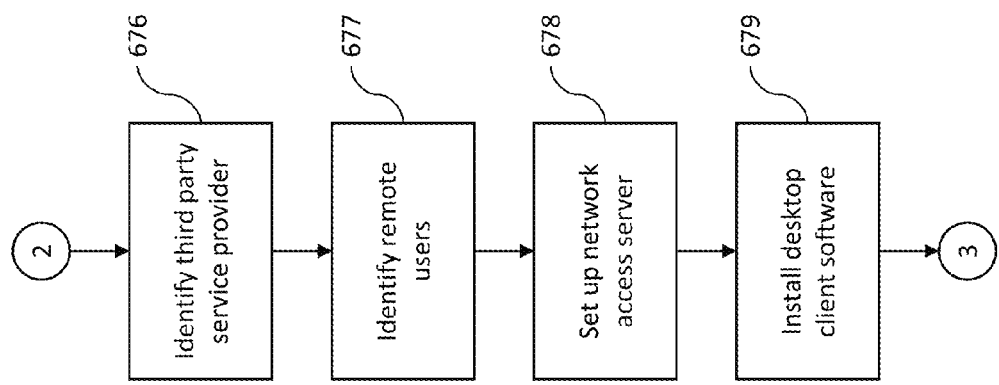
FIG. 9 is a schematic diagram of a virtual private network system according to systems and methods herein.

In FIGS. 8 and 9, step 660 begins the Virtual Private Network (VPN) process. A determination is made to see if a VPN for remote access is required 661. If it is not required, then proceed to 662. If it is required, then determine if the remote access VPN exists 664.

If it does exist, then proceed to 665. Otherwise, identify the third party provider that will provide the secure, encrypted connections between the company's private network and the company's remote users 876. The company's remote users are identified 877. The third party provider then sets up a network access server (NAS) 878 that allows the remote users to dial a toll-free number or attach directly via a cable or DSL modem to access, download, and install the desktop client software for the remote-access VPN 879.

After the remote access VPN has been built, or if it been previously installed, the remote users can then access the process software by dialing into the NAS or attaching directly via a cable or DSL modem into the NAS 665. This allows entry into the corporate network where the process software is accessed 666. The process software is transported to the remote users' desktop over the network via tunneling. That is, the process software is divided into packets and each packet, including the data and protocol, is placed within another packet 667. When the process software arrives at the remote users' desktop, it is removed from the packets, reconstituted, and executed on the remote users' desktop 668.

A determination is made to see if a VPN for site-to-site access is required 662. If it is not required, then proceed to exit the process 663. Otherwise, determine if the site-to-site VPN exists 669. If it does exist, then proceed to 872. Otherwise, install the dedicated equipment required to establish a site-to-site VPN 870. Then build the large-scale encryption into the VPN 871.

After the site-to-site VPN has been built, or if it had been previously established, the users access the process software via the VPN 872. The process software is transported to the site users over the network via tunneling 873. That is, the process software is divided into packets and each packet, including the data and protocol, is placed within another packet 874. When the process software arrives at the remote users' desktop, it is removed from the packets, reconstituted, and executed on the site users' desktop 875. Proceed to exit the process 663.

The terminology used herein is for the purpose of describing particular systems and methods only and is not intended to be limiting of this disclosure. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

In addition, terms such as "right", "left", "vertical", "horizontal", "top", "bottom", "upper", "lower", "under", "below", "underlying", "over", "overlying", "parallel", "perpendicular", etc., used herein are understood to be relative locations as they are oriented and illustrated in the drawings (unless otherwise indicated). Terms such as "touching", "on", "in direct contact", "abutting", "directly adjacent to", etc., mean that at least one element physically contacts another element (without other elements separating the described elements).

The corresponding structures, materials, acts, and equivalents of all means or step plus function elements in the claims below are intended to include any structure, material, or act for performing the function in combination with other claimed elements as specifically claimed. The descriptions of the various systems and methods herein have been presented for purposes of illustration, but are not intended to be exhaustive or limited to the systems and methods disclosed. Many modifications and variations will be apparent to those of ordinary skill in the art without departing from the scope and spirit of the described systems and methods. The terminology used herein was chosen to best explain the principles of the systems and methods, the practical application or technical improvement over technologies found in the marketplace, or to enable others of ordinary skill in the art to understand the systems and methods disclosed herein.

What is claimed is:

1. A vehicle climate control system comprising:
    a temperature sensor determining a temperature of a cabin area of a vehicle;
    a controller operatively connected to said temperature sensor;
    an air conditioner and a heater operatively connected to said controller and controlling said temperature of said cabin area of said vehicle;
    a first location sensor, comprising a smartphone, connected to said controller using a wireless connection, said first location sensor monitoring a location of an operator of said vehicle by a built-in GPS system;
    a second location sensor connected to said controller, said second location sensor monitoring a location of said vehicle; and
    a processor operatively connected to said controller,
    said processor determining a path that said operator of said vehicle may travel between said location of said operator and said location of said vehicle,
    said processor calculating a distance of said path,
    said processor determining an amount of time required for said operator of said vehicle to travel said distance of said path between said location of said operator and said location of said vehicle,
    said processor determining an amount of time required to adjust said temperature of said cabin area of said vehicle to a selected temperature by selectively using one of said air conditioner and said heater, and
    said processor automatically selectively operating one of said air conditioner and said heater to begin adjusting said temperature of said cabin area of said vehicle to said selected temperature when said amount of time required for said operator to travel between said location of said operator and said location of said vehicle is less than or equal to said amount of time required to adjust said temperature of said cabin area of said vehicle to said selected temperature.

2. The vehicle climate control system according to claim 1, said controller automatically operating one of a vehicle seat heater and a vehicle seat cooler.

3. The vehicle climate control system according to claim 1, said controller one of automatically opening at least one of a sunroof and a window of said vehicle and automatically operating a defroster of said vehicle.

4. The vehicle climate control system according to claim 1, said first location sensor further comprising a key fob.

5. The vehicle climate control system according to claim 1, said processor monitoring a location of said operator of said vehicle using said first location sensor, further comprising:
    monitoring distance of said operator from said vehicle;
    monitoring actions of said operator;
    monitoring a calendar for said operator;
    monitoring a manual indication from said operator; and
    associating historical time-to-return for said operator.

6. The vehicle climate control system according to claim 1, further comprising:
    said processor assessing outside air temperature and humidity;
    said processor assessing inside cabin air temperature and humidity;
    said processor assessing outside wind speed;
    said processor assessing one of historical and programmed data on changes in temperature over time; and
    said processor calculating said amount of time required to adjust said temperature of said cabin area of said vehicle to said selected temperature based on said assessing.

7. The vehicle climate control system according to claim 1, said processor accounting for a walking speed of said operator and obstacles in said path while determining said amount of time required for said operator to travel said path between said location of said operator and said location of said vehicle.

8. The vehicle climate control system according to claim 1, further comprising:
    said processor starting said vehicle to operate said vehicle climate control system.

9. A system comprising:
    a temperature sensor determining a temperature of a cabin area of a vehicle;
    a controller operatively connected to said temperature sensor;
    a climate control system operatively connected to said controller and controlling said temperature of said cabin area of said vehicle;
    a processor operatively connected to said controller; and
    a smartphone having a built-in GPS system, operatively connected to said processor,
    said processor monitoring a location of an operator of said vehicle using said built-in GPS system of said smartphone,
    said processor determining a path that said operator of said vehicle may travel between said location of said operator and said vehicle,
    said processor calculating a distance of said path,
    said processor determining an amount of time required for said operator of said vehicle to travel said distance of said path between said location of said operator and said vehicle, said processor determining an amount of time required to adjust said temperature of said cabin area of said vehicle to a selected temperature by operating said climate control system, and said processor automatically operating said climate control system to begin adjusting said temperature of said cabin area of said vehicle to said selected temperature when said amount of time required for said operator to travel between said location of said operator and said vehicle is less than or equal to said amount of time required to adjust said temperature of said cabin area of said vehicle to said selected temperature.

10. The system according to claim 9, said climate control system comprising:
an air conditioner and a heater operatively connected to said controller.

11. The system according to claim 9, said controller one of automatically opening at least one of a sunroof and a window of said vehicle and automatically operating a defroster of said vehicle.

12. The system according to claim 9, said processor monitoring a location of said operator of said vehicle, further comprising:
monitoring distance of said operator from said vehicle;
monitoring actions of said operator;
monitoring a calendar for said operator;
monitoring a manual indication from said operator; and
associating historical time-to-return for said operator.

13. The system according to claim 9, further comprising:
said processor assessing outside air temperature and humidity;
said processor assessing inside cabin air temperature and humidity;
said processor assessing outside wind speed;
said processor assessing one of historical and programmed data on changes in temperature over time; and
said processor calculating said amount of time required to adjust said temperature of said cabin area of said vehicle to said selected temperature based on said assessing.

14. The system according to claim 9, said processor accounting for a walking speed of said operator and obstacles in said path while determining said amount of time required for said operator to travel said path between said location of said operator and said vehicle.

15. The system according to claim 9, further comprising:
said processor starting said vehicle to operate said climate control system.

16. A device comprising:
a processor operatively connected to a climate control system, said climate control system comprising an air conditioner and a heater operatively connected to said processor and controlling temperature of a cabin area of a vehicle, said processor having a vehicle location sensor monitoring a location of said vehicle, and said processor being wirelessly connected to a smartphone having a built-in GPS system monitoring a location of an operator of said vehicle using said built-in GPS system of said smartphone, said processor determining a path that said operator of said vehicle may travel between said location of said operator and said location of said vehicle, said processor calculating a distance of said path, said processor determining an amount of time required for said operator of said vehicle to travel said distance of said path between said location of said operator and said location of said vehicle by accounting for a walking speed of said operator and obstacles in said path, said processor determining an amount of time required to adjust said temperature of said cabin area of said vehicle to a selected temperature by operating said climate control system, and said processor automatically operating said climate control system to begin adjusting said temperature of said cabin area of said vehicle to said selected temperature when said amount of time required for said operator to travel between said location of said operator and said vehicle is less than or equal to said amount of time required to adjust said temperature of said cabin area of said vehicle to said selected temperature.

17. The device according to claim 16, said controller automatically operating one of a vehicle seat heater and a vehicle seat cooler.

18. The device according to claim 16, said controller one of automatically opening at least one of a sunroof and a window of said vehicle and automatically operating a defroster of said vehicle.

19. The device according to claim 16, further comprising:
said processor assessing outside air temperature and humidity;
said processor assessing inside cabin air temperature and humidity;
said processor assessing outside wind speed;
said processor assessing one of historical and programmed data on changes in temperature over time; and
said processor calculating said amount of time required to adjust said temperature of said cabin area of said vehicle to said selected temperature based on said assessing.

20. The device according to claim 16, further comprising:
said processor starting said vehicle to operate said climate control system.

* * * * *